May 26, 1925. 1,539,644
M. D. CADY
RIDING ATTACHMENT FOR HARROWS
Filed May 29, 1924 2 Sheets-Sheet 2

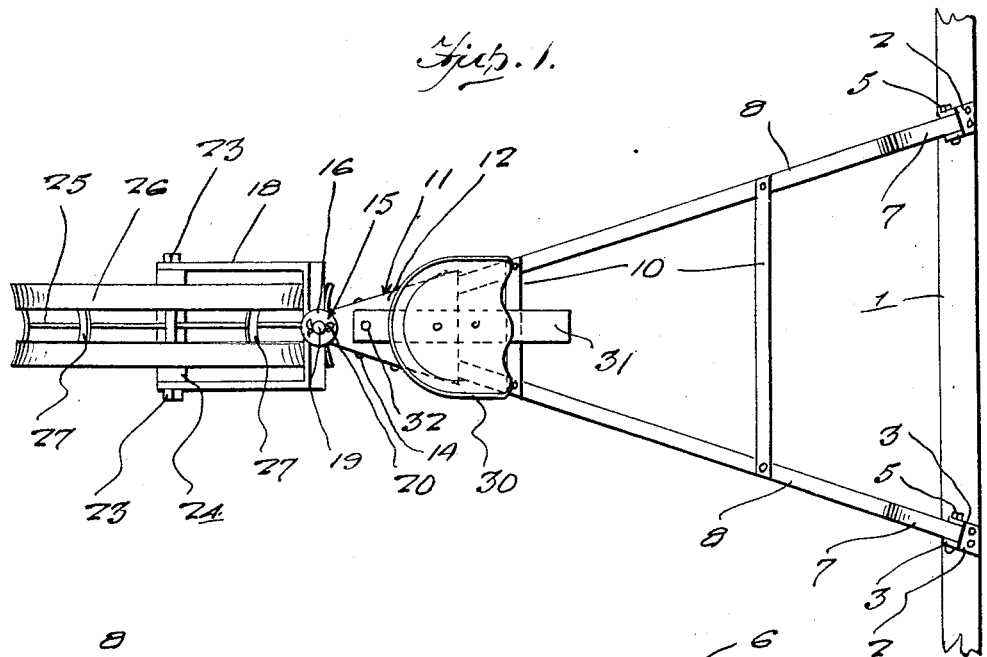
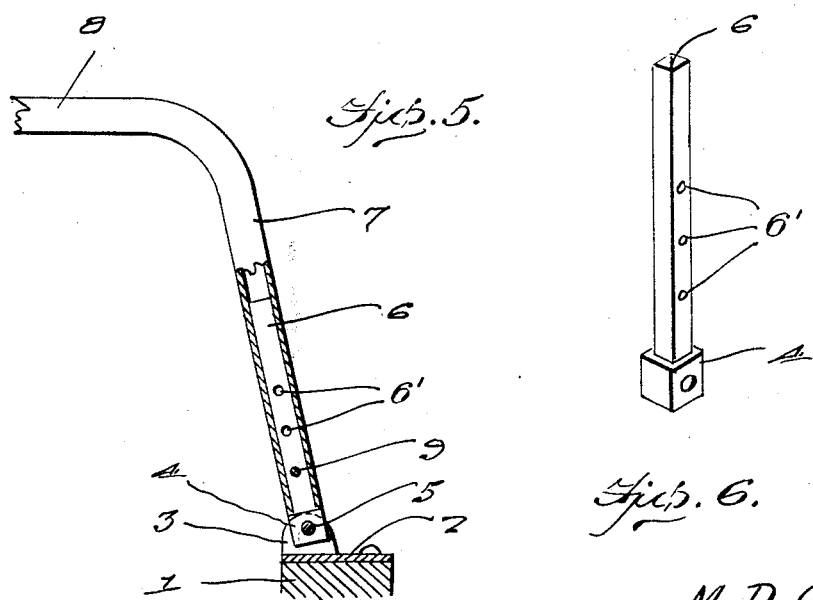

Inventor
M. D. Cady
By Clarence A. O'Brien
Attorney

Patented May 26, 1925.

1,539,644

UNITED STATES PATENT OFFICE.

MORTIMER D. CADY, OF AMIRET, MINNESOTA.

RIDING ATTACHMENT FOR HARROWS.

Application filed May 29, 1924. Serial No. 716,767.

*To all whom it may concern:*

Be it known that I, MORTIMER D. CADY, a citizen of the United States, residing at Amiret, in the county of Lyon and State of Minnesota, have invented certain new and useful Improvements in Riding Attachments for Harrows, of which the following is a specification.

This invention relates to harrow attachments and particularly to a riding attachment so that the operator of the harrow may ride, instead of walking behind the same.

An object of the invention resides in providing a harrow attachment composed of relatively few parts mounting a seat and a wheel, and adapted for attachment to the rear end of the harrow, so that the operator may ride instead of walking.

Another object of the invention resides in providing a harrow attachment of the class described, wherein a frame adapted for attachment to the harrow has an adjustable pivotal connection therewith and includes a pair of frame bars arranged in angular relation and connected at the rear ends to a plate member, which mounts the seat for the rider and is formed with a bearing for mounting a wheel.

The invention also includes other objects and improvements in the details of construction of the parts and assemblage of the same, for producing a device of simple construction, which is more particularly pointed out in the following description and claims directed to a preferred form of the invention, it being understood that various changes may be made in the details of construction, and arrangement of the parts, without departing from the spirit and scope of the invention as described and claimed.

In the drawing, forming a part of this application:

Figure 1 is a plan view of the attachment.

Figure 5 is an enlarged detail view, showing the pivotal and adjustable connection of the frame bar with the harrow.

Figure 6 is an enlarged detail view of the block member pivoted on the bracket carried by the harrow for cooperation with the frame bar to effect the adjustable and pivotal connection with said harrow.

Figure 2:
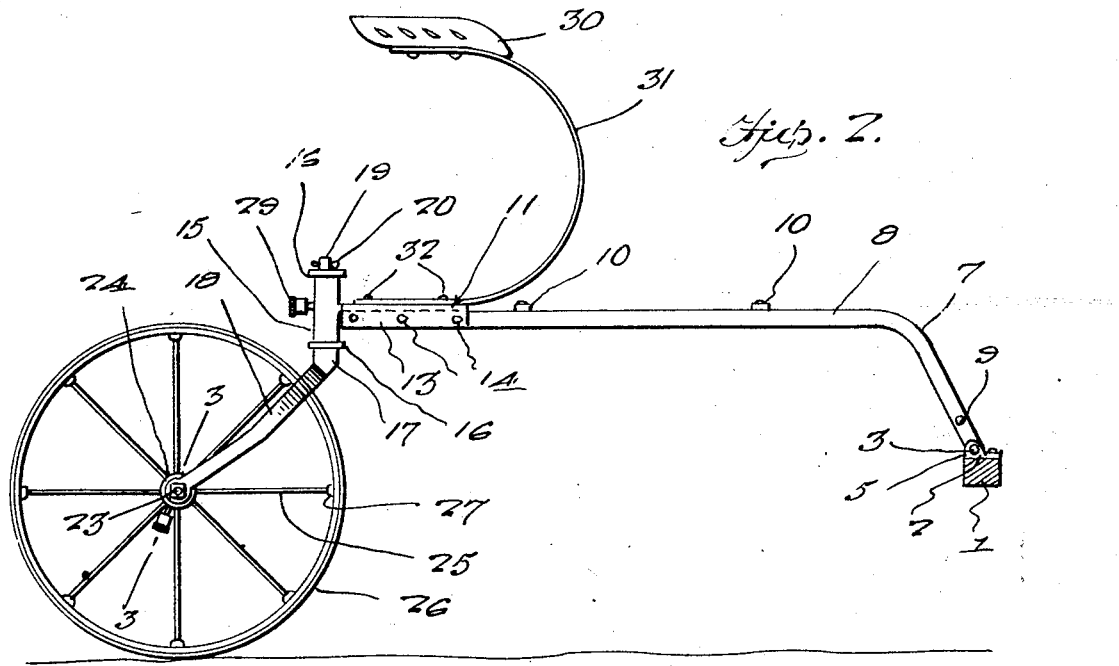
Figure 2 is a side elevation thereof.
Figures 3, 4:
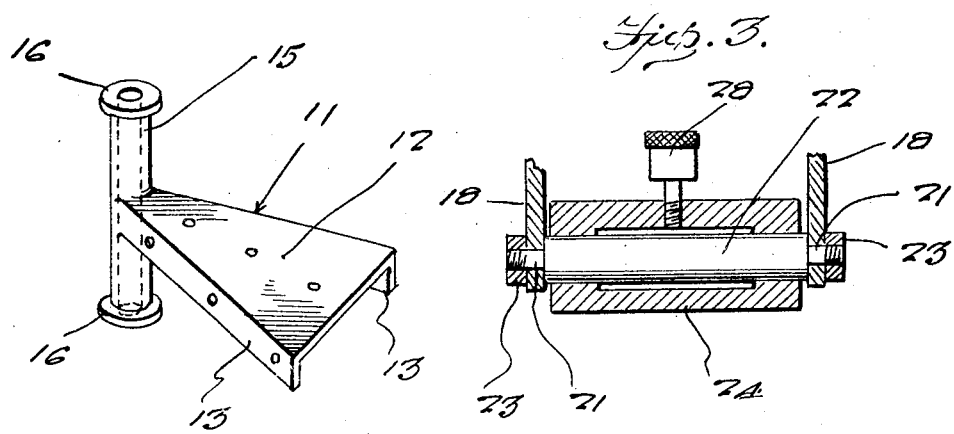
Figure 3 is a sectional view showing the manner of mounting the wheel taken on the line 3—3 of Figure 2.
Figure 4 is an enlarged perspective view of the plate member.

The rear frame bar of any suitable form of harrow is indicated at 1, on which is mounted a pair of brackets 2, in spaced angular relation, as indicated in Figure 1, which are provided with upstanding ears 3 between which is received and pivotally mounted an elongated block member 4, by a suitable bolt 5. The block is formed with a reduced shank portion 6, provided with a plurality of spaced openings 6' extending transversely therethrough, which shank portion 6 is adapted for slidably interfitting in the downwardly extended end portion 7 of the angularly arranged frame bars 8. A pin, indicated at 9, extends transversely through the hollow end 7 of each frame bar, as indicated in Figure 2, for engagement with one of said openings 6', in the reduced shank 6, of the block member, for securing said frame bars in a desired position of adjustment with respect to the rear frame bar of the harrow. A pair of cross bars 10 extend transversely of the frame bars 8, in spaced relation intermediate the ends thereof, and are secured to said frame bars for holding them in angular spaced relation, the longer of said cross bars being adapted to form a suitable foot rest for the operator of the harrow.

A plate member is indicated at 11, which includes a horizontal portion 12 of substantially triangular form, having a pair of depending flanges 13 on the sides thereof, which are adapted to receive the free ends of the hollow frame bars 8, which terminate in close proximity beneath the plate 12 and are secured by suitable rivets or the like, 14, to the flanges 13, in a manner as clearly shown in Figures 1 and 2. The apex portion of the triangular plate is formed with a bearing sleeve 15, extending transversely thereof and formed integral therewith at the central portion, the flanges 13 also extending to said bearing sleeve and being formed integral with said sleeve, the ends of which are provided with annular flanges 16, the lower one of which is adapted to provide a thrust bearing for the head 17, on the wheel carrying fork 18. A pintle 19 projects axially from said head 17, and is of reduced diameter adapted for rotatable mounting in the sleeve 15, a cotter pin or the like securing means 20 preventing the disconnection of said pintle and wheel carrying fork, from the sleeve carrying the plate member. The lower end of the wheel carrying fork is provided with an opening for receiving the reduced threaded extension 21, of the stationary axle 22, which is adapted to be carried thereby, nuts 23 securing said axle to said wheel carrying fork, while the wheel includes a hub portion 24 rotatably mounted on said axle. Suitable spoke connections 25 are provided with the axle, and a pair of operatively inclined rims 26 connected by bar members 27. A grease cup 28 or the like, may be provided in the hub 24 of the wheel for supplying lubricant thereto, in order to reduce wear on the axle and increase the life of the same. A grease cup 29 is also provided on the sleeve bearing 15 of the plate member, for supplying lubricant to the pintle 19, in order that wear of the pintle and bearing may be reduced and easy turning permitted.

A seat, indicated at 30, is provided with a suitable curved spring support 31 having one end secured to the seat and secured at its opposite end to the surface 12 of said plate member, by a plurality of bolts 32, the end portion of the member 31 having openings corresponding to the openings in the plate, and adapted to permit a limited adjustment thereof through the changing of the registering relation of the holes in the plate and those in the ends of the spring supporting member 31, for receiving the bolts 32.

With the parts constructed and connected to a harrow, as shown in the drawing, it should be readily appreciated that a substantially simple and efficient rider attachment has been provided for the usual walking type of harrow, which will permit the operator to ride instead of walking, and which will, in no way, affect the efficient operation of the harrow, and which may be adjusted to suit the convenience of the operator and the center of gravity of his weight, which has an effect on the operator of the harrow, in a desired manner.

What is claimed is:

1. A device of the class described comprising a plate formed with a bearing, a pair of angularly arranged frame bars having adjacently arranged ends mounted on said plate and diverging therefrom, adjustable and pivotal connections between the opposite ends of said frame bars and the frame of a harrow, a wheel carrying fork rotatably mounted in the bearing of the plate member, and a rider's seat mounted on said plate member.

2. A device of the class described comprising a plate member, a bearing formed on said plate member, a wheel carrying fork having a pintle rotatably mounted in said bearing, a pair of frame bars each having one end secured to said plate in adjacent relation and extending outwardly therefrom in angular relation, the opposite ends of said frame bars being formed with depending ends, the bar members pivotally mounted on a harrow frame having an adjustable connection with the depending ends of said frame bars, and a seat having a spring support connected to said plate member.

In testimony whereof I affix my signature.

MORTIMER D. CADY.